United States Patent [19]

Tzavaras

[11] Patent Number: 5,125,368
[45] Date of Patent: Jun. 30, 1992

[54] APPARATUS FOR PROTECTING THE TRANSMISSION OF A VEHICLE

[76] Inventor: Constantine Tzavaras, 18 Hodgkins Dr., Ipswich, Mass. 01938

[21] Appl. No.: 532,941

[22] Filed: Jun. 4, 1990

[51] Int. Cl.⁵ ............................................. F01P 1/06
[52] U.S. Cl. ................................. 123/41.31; 60/912; 74/606 A
[58] Field of Search ............... 123/41.31; 192/113 R, 192/113 B; 60/456, 912; 74/606 A

[56] References Cited

U.S. PATENT DOCUMENTS

| | | | |
|---|---|---|---|
| 2,244,641 | 6/1941 | Fedders | 123/196 AB |
| 2,357,606 | 9/1944 | Nutt | 184/6 |
| 2,405,135 | 8/1946 | Butzbach | 60/912 |
| 2,796,239 | 6/1957 | Holmes et al. | 60/456 |
| 3,315,464 | 4/1967 | Hayden | 60/912 |
| 3,874,183 | 4/1975 | Tabet | 123/196 AB |
| 4,036,188 | 7/1977 | Sami et al. | 123/41.31 |
| 4,156,407 | 5/1979 | Moll et al. | 123/196 AB |
| 4,327,674 | 5/1982 | Takei | 123/41.12 |
| 4,370,956 | 2/1983 | Moser et al. | 123/196 AB |
| 4,691,668 | 9/1987 | West | 123/41.12 |
| 4,728,306 | 3/1988 | Schneider | 123/41.31 |
| 4,829,939 | 5/1989 | Veenemans et al. | 123/41.31 |

FOREIGN PATENT DOCUMENTS

1024503  3/1966  United Kingdom ............ 60/912

*Primary Examiner*—Noah P. Kamen
*Attorney, Agent, or Firm*—Michael M. Murray

[57] ABSTRACT

An apparatus for maintaining the temperature of the transmission of a motorized vehicle within safe limits when the vehicle's engine is not running. The apparatus includes a pump for circulating fluid through the transmission, the pump being operable independently of the operation of the motor that drives the vehicle. Therefore, a vehicle can be safely towed any distance without the need to elevate the vehicle to prevent the vehicle's wheels from turning. In the preferred embodiment, a power source provides power to the pump. A switch selectively connects the power source to the pump to enable the pump to be turned on and off. Fluid is pumped to a radiator through a first fluid flow line connected between the pump and the radiator, and returns to the transmission through a second fluid flow line connected between the transmission and the radiator. A fan is positioned in close proximity to the radiator such that the fan can push air through the radiator. A temperature control circuit controls the operation of the fan by stopping and starting the fan in response to a temperature reading of the fluid that leaves the radiator through the second fluid flow line. The temperature control circuit starts the operation of the fan if the temperature reading is above a predetermined temperature.

17 Claims, 1 Drawing Sheet

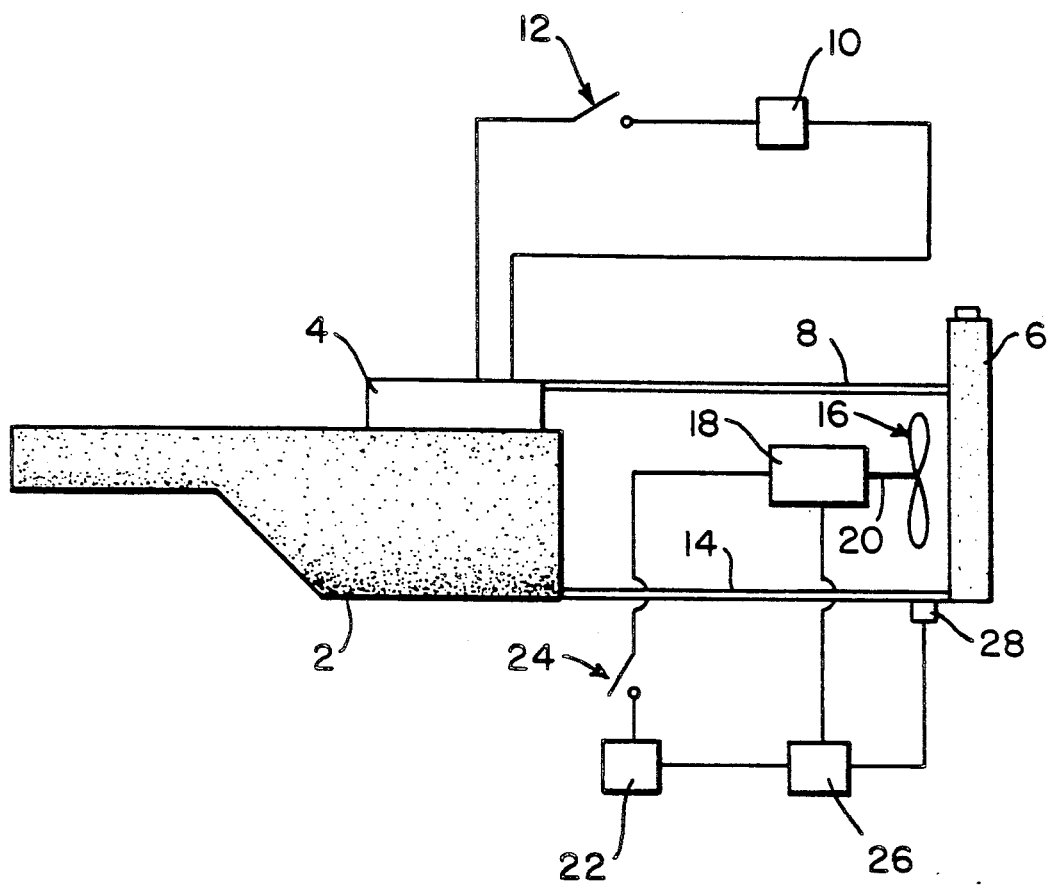

APPARATUS FOR PROTECTING THE TRANSMISSION OF A VEHICLE

BACKGROUND OF THE INVENTION

It is sometimes desirable to move an automobile or other vehicle without using its engine and driving the vehicle in the usual manner. For example, the vehicle may be inoperative and therefore unable to be driven, necessitating that it be towed or pulled to a repair shop. Properly operating vehicles are also sometimes towed. Many owners of recreational vehicles or mobile homes will pull a car behind the mobile home as they travel so that they do not have to rely on the mobile home for their only source of transportation. Furthermore, if it is necessary to transport two vehicles but only one driver is available, one vehicle is often used to tow the second vehicle.

In most vehicles, the wheels that drive the vehicle (e.g., the front wheels on a front-wheel drive vehicle, the rear wheels on a rear-wheel drive vehicle, and every wheel on a four-wheel drive car) are directly connected to the transmission through the vehicle's drive shaft. Therefore, if the vehicle's wheels are rotated when the vehicle is being towed (which would happen, e.g., if the vehicle was pulled), the rotation of the wheels will cause components within the transmission to rotate, and heat will be generated by the friction caused by these moving components. If the vehicle is towed over a substantial distance, the amount of heat generated can seriously damage or destroy the transmission.

In order to avoid this problem, cars are usually towed by raising the appropriate wheels above the ground (which would be all four wheels on a four-wheel drive vehicle) so that the wheels do not turn as the car is moved. People who want to tow their car behind a recreational vehicle, for example, will usually rent a trailer and drive the car to be towed up onto the trailer so that the car can be pulled on the trailer without rotating any of the car's wheels.

SUMMARY OF THE INVENTION

The present invention generally features an apparatus for maintaining the temperature of the transmission of a motorized vehicle within safe limits, the apparatus comprising a pump for circulating fluid through the transmission, the pump being operable independently of the operation of the motor that drives the vehicle. Therefore, a vehicle can be safely towed any distance without the need to elevate the vehicle to prevent the vehicle's wheels from turning.

In the preferred embodiment, a power source provides power to the pump. A switch selectively connects the power source to the pump to enable the pump to be turned on and off. The fluid is pumped to a radiator through a first fluid flow line connected between the pump and the radiator, and returns to the transmission through a second fluid flow line connected between the transmission and the radiator. A fan is positioned in close proximity to the radiator such that the fan can push air through the radiator. A temperature control circuit controls the operation of the fan by stopping and starting the fan in response to a temperature reading of the fluid that leaves the radiator through the second fluid flow line. The temperature control circuit starts the operation of the fan if the temperature reading is above a predetermined temperature.

BRIEF DESCRIPTION OF THE DRAWING

The sole drawing is an illustration of a transmission protection apparatus according to the invention.

DETAILED DESCRIPTION OF THE PREFERRED EMBODIMENTS

Referring to the figure, transmission 2 represents the transmission of any motor operated vehicle. A pump 4 is connected to transmission 2 and is connected to a radiator 6 through an upper fluid flow line 8. Pump 4 is powered by a power source 10 and may be switched on and off through a switch 12. Radiator 6 and transmission 2 are connected by a lower fluid flow line 14. A fan 16 is positioned in close proximity to radiator 6 and is connected to a motor 18 by a drive shaft 20. Motor 18 is powered by a power source 22 and is controlled though a main switch 24. Motor 18 is also controlled by a thermostat control device 26 which is connected to a temperature sensor 28, positioned adjacent to lower fluid flow line 14.

To operate the transmission protection system, switch 12 is closed thereby activating pump 4. Pump 4 will draw cooling fluid out of transmission 2 and deliver the fluid through upper fluid flow line 8 to radiator 6. As the fluid passes through radiator 6, it will radiate heat thereby becoming cooler, the cool fluid returning to transmission 2 through lower fluid flow line 14. This circulation of fluid will continually draw heat away from the transmission and prevent the transmission from overheating.

In order to improve the dissipation of heat from the cooling fluid as it flows through radiator 6, fan 16 can be engaged to blow air through the radiator. By closing main switch 24, power supply 22 will be connected to motor 18 causing motor 18 to drive fan 16 through drive shaft 20. In order to conserve power, fan 16 is operated only when the temperature of the fluid leaving radiator 6 is above a predetermined temperature. In other words, fan 16 can be turned off if the fluid is radiating enough heat as it passes through radiator 6 to safely maintain the temperature of transmission 2. Fan 16 must be turned back on once the temperature of the fluid becomes too high to properly cool the transmission. To accomplish this regulation of fan 16, temperature sensor 28 (e.g., a thermometer) is placed in close proximity to lower fluid flow line 14 in order to read the temperature of the fluid as it leaves radiator 6. The temperature of the fluid is input to a thermostat control 26 which will disconnect power supply 22 from motor 18 if the temperature of the fluid is below a predetermined temperature. Thermostat control 26 reactivates motor 18 if the temperature reading exceeds a predetermined temperature. Similar thermostat controls are used widely in many applications such as conventional home heating systems, refrigerators, and air conditioners.

Power supplies 10 and 22 can be the same power supply, and can be e.g., the car battery or some outside source. Since the battery of the car being towed is not being recharged by the car's engine, it is generally preferable to use an outside power source in order to avoid damaging the car battery. The outside source could be derived from whatever vehicle is doing the towing.

The present invention allows vehicles to be towed for virtually unlimited distances without the need for expensive trailers or other devices for towing the vehicle without rotating its wheels. The pump of the present invention will maintain the transmission at a safe temperature.

Other embodiments of the invention are within the scope of the following claims.

I claim:

1. An apparatus for controlling the temperature of the transmission of a motorized vehicle, comprising:
    a pump for circulating fluid through said transmission; and
    means for activating said pump, said activating means being operable to begin activation of said pump when the motor that drives the vehicle is not operating.

2. The apparatus of claim 1 further comprising an electric power source connected to said pump for providing power to said pump.

3. The apparatus of claim 2 further comprising a switch for selectively connecting said power source to said pump.

4. The apparatus of claim 1 further comprising a radiator, a first fluid flow line connected between said pump and said radiator, and a second fluid flow line connected between said transmission and said radiator, such that said pump can draw said fluid from the transmission, transmit the fluid through said first fluid flow line to the radiator, said fluid returning to the transmission from the radiator through said second fluid flow line.

5. The apparatus of claim 4 further comprising a fan positioned in close proximity to said radiator such that said fan can push air through said radiator.

6. The apparatus of claim 5 further comprising a temperature control circuit for controlling the operation of said fan, said temperature control circuit stopping and starting said fan in response to the temperature reading at a predetermined point.

7. The apparatus of claim 6 wherein said predetermined point is in the vicinity of said second fluid flow line.

8. The apparatus of claim 6 wherein said temperature control circuit starts the operation of said fan if said temperature reading is above a predetermined temperature.

9. An apparatus for controlling the temperature of the transmission of a motorized vehicle, comprising:
    a pump for circulating fluid through said transmission; and
    means for activating said pump, said activating means causing said pump to circulate said fluid through said transmission for one of a plurality of different periods of time selected by a user, wherein the motor that drives the vehicle is not operating during said selected period of time.

10. The apparatus of claim 9 wherein the motor that drives the vehicle is not operating when said activating means causes said pump to begin circulating said fluid.

11. An apparatus for controlling the temperature of the transmission of a motorized vehicle, comprising:
    a pump for circulating fluid through said transmission; and
    means for activating said pump, said activating means causing said pump to circulate said fluid through said transmission;
    wherein said means for activating said pump can activate or deactivate said pump directly under the control of a user without turning said motor on or off.

12. A method for controlling the temperature of a transmission of a motorized vehicle, said vehicle comprising a pump for circulating fluid through said transmission, said method comprising the steps of:
    circulating fluid through said transmission,
    passing said fluid that has been circulated through said transmission through a heat exchanger to thereby reduce the temperature of said fluid, and
    iteratively repeating said steps of circulating and passing to thereby draw heat away from said transmission,
    wherein said step of iteratively repeating said steps of circulating and passing is carried out for one of a plurality of different periods of time selected by a user, and wherein said motor that drives the motorized vehicle is not operating during said selected period of time.

13. The method of claim 12 wherein said steps of circulating and passing are initially commenced by activating a pump that circulates said fluid through said transmission.

14. The method of claim 12 wherein the motor that drives the vehicle is not operating when said step of circulating is first performed.

15. The method of claim 12 wherein said heat exchanger comprises a radiator.

16. The method of claim 15 wherein a fan is positioned in close proximity to said radiator and wherein said method further comprises the step of controlling the operation of said fan by stopping and starting said fan in response to the temperature of said fluid at a predetermined point.

17. A method for controlling the temperature of a transmission of a motorized vehicle, said vehicle comprising a pump from circulating fluid through said transmission, said method comprising the steps of:
    circulating fluid through said transmission,
    passing said circulated fluid through a heat exchanger to thereby reduce the temperature of said fluid, and
    iteratively repeating said steps of circulating and passing to thereby draw heat away from said transmission,
    wherein said steps of circulating, passing and iteratively repeating are initiated or terminated directly by a user without turning the motor that drives the vehicle on or off.

* * * * *